United States Patent
Greco et al.

(10) Patent No.: US 10,731,622 B2
(45) Date of Patent: Aug. 4, 2020

(54) DEVICE FOR CONVERSION OF MECHANICAL ENERGY FROM SEA WAVES TO ELECTRIC ENERGY

(71) Applicant: ENSEA S.R.L., Lecce (IT)

(72) Inventors: Paolo Greco, Trepuzzi (IT); Marcello Di Risio, Casalbordino (IT)

(73) Assignee: Ensea S.R.L., Lecce (IT)

( * ) Notice: Subject to any disclaimer, the term of this patent is extended or adjusted under 35 U.S.C. 154(b) by 12 days.

(21) Appl. No.: 15/745,078

(22) PCT Filed: Aug. 3, 2016

(86) PCT No.: PCT/EP2016/068591
§ 371 (c)(1),
(2) Date: Jan. 15, 2018

(87) PCT Pub. No.: WO2018/024332
PCT Pub. Date: Feb. 8, 2018

(65) Prior Publication Data
US 2020/0080534 A1    Mar. 12, 2020

(51) Int. Cl.
*F03B 13/14* (2006.01)
*B63B 22/18* (2006.01)
*H02K 7/18* (2006.01)

(52) U.S. Cl.
CPC .............. *F03B 13/14* (2013.01); *B63B 22/18* (2013.01); *H02K 7/1853* (2013.01)

(58) Field of Classification Search
CPC ....................................................... F03B 13/14
USPC .............................................. 290/53; 60/504
See application file for complete search history.

(56) References Cited

U.S. PATENT DOCUMENTS

| 4,076,463 A | | 2/1978 | Welczer | |
|---|---|---|---|---|
| 4,145,885 A | * | 3/1979 | Solell | F03B 13/1855 290/53 |
| 4,208,877 A | | 6/1980 | Evans et al. | |
| 4,228,360 A | | 10/1980 | Navarro | |
| 4,241,579 A | * | 12/1980 | Borgren | F03B 13/1885 60/504 |

(Continued)

FOREIGN PATENT DOCUMENTS

| GB | 190743 A | 12/1922 |
|---|---|---|
| WO | 2007086750 A1 | 8/2007 |

(Continued)

*Primary Examiner* — Pedro J Cuevas
(74) *Attorney, Agent, or Firm* — Oppenhuizen Law PLC; David L. Oppenhuizen

(57) ABSTRACT

Device for converting mechanical energy from sea waves into electric energy including at least a float and two rigid rods. The rods are preferably anchored to the seabed at one end, and to the float at another end. There are also two ballasts that effect their weight towards the sea bed to keep the free ends of the rods constantly in traction and free to rotate around their hinges. The float oscillates up and down along a vertical line due to waves. There are at least two cables that connect the free ends of the rods to a transmission shaft of a generator positioned along the vertical line so that the vertical, horizontal, or rotary oscillatory motion of the float caused by the waves generates an oscillatory motion of the rods which are pivoted on their respective hinges, and thus transfers rotary motion to the transmission shaft of the generator.

9 Claims, 10 Drawing Sheets

(56) References Cited

U.S. PATENT DOCUMENTS

| | | | |
|---|---|---|---|
| 4,781,023 A | | 11/1988 | Gordon |
| 5,066,867 A | | 11/1991 | Shim |
| 5,808,368 A | | 9/1998 | Brown |
| 6,756,695 B2 | | 6/2004 | Hibbs et al. |
| 6,930,406 B2 | | 8/2005 | Montgomery |
| 7,444,810 B2 | | 11/2008 | Olson |
| 7,845,880 B2 | | 12/2010 | Rasmussen |
| 7,930,885 B2 | | 4/2011 | Brown |
| 8,049,356 B2 | | 11/2011 | Chervin et al. |
| 8,093,736 B2 | * | 1/2012 | Raftery .............. F03B 13/1885 290/42 |
| 8,581,433 B2 | | 11/2013 | Sidenmark |
| 8,667,791 B2 | | 3/2014 | McEvoy et al. |
| 8,823,196 B1 | | 9/2014 | Gehring |
| 8,901,766 B2 | | 12/2014 | Werjefelt |
| 9,062,649 B2 | * | 6/2015 | Greco ................... F28F 27/02 |
| 9,068,551 B2 | * | 6/2015 | Sidenmark .......... F03B 13/1885 |
| 10,190,568 B2 | * | 1/2019 | Gregory ................ F03B 15/02 |
| 2008/0197631 A1 | | 8/2008 | Medina et al. |
| 2010/0045044 A1 | | 2/2010 | Patterson |
| 2014/0117671 A1 | | 5/2014 | Gregory |
| 2015/0021918 A1 | * | 1/2015 | Greco ................... F28F 27/02 290/53 |
| 2019/0040840 A1 | * | 2/2019 | Rohrer ................ F03B 13/182 |
| 2019/0360452 A1 | * | 11/2019 | Qu ..................... F03B 13/1875 |

FOREIGN PATENT DOCUMENTS

| | | |
|---|---|---|
| WO | 2011116100 A2 | 9/2011 |
| WO | 2013064607 A1 | 5/2013 |

\* cited by examiner

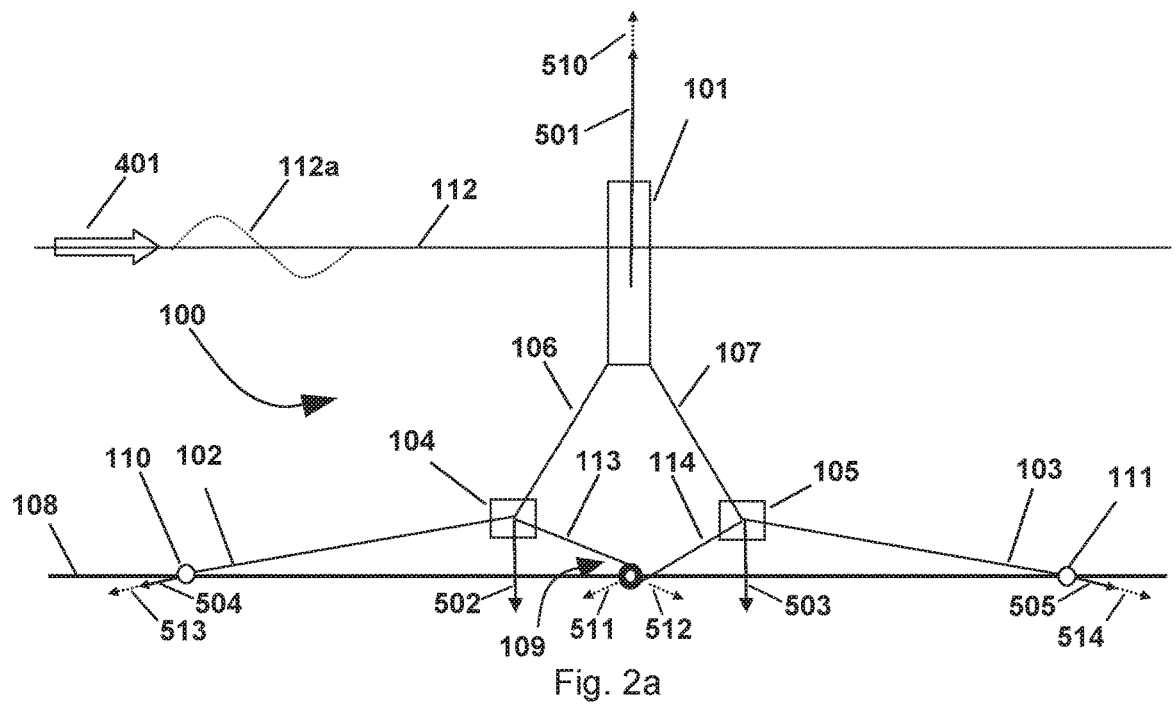
Fig. 2a
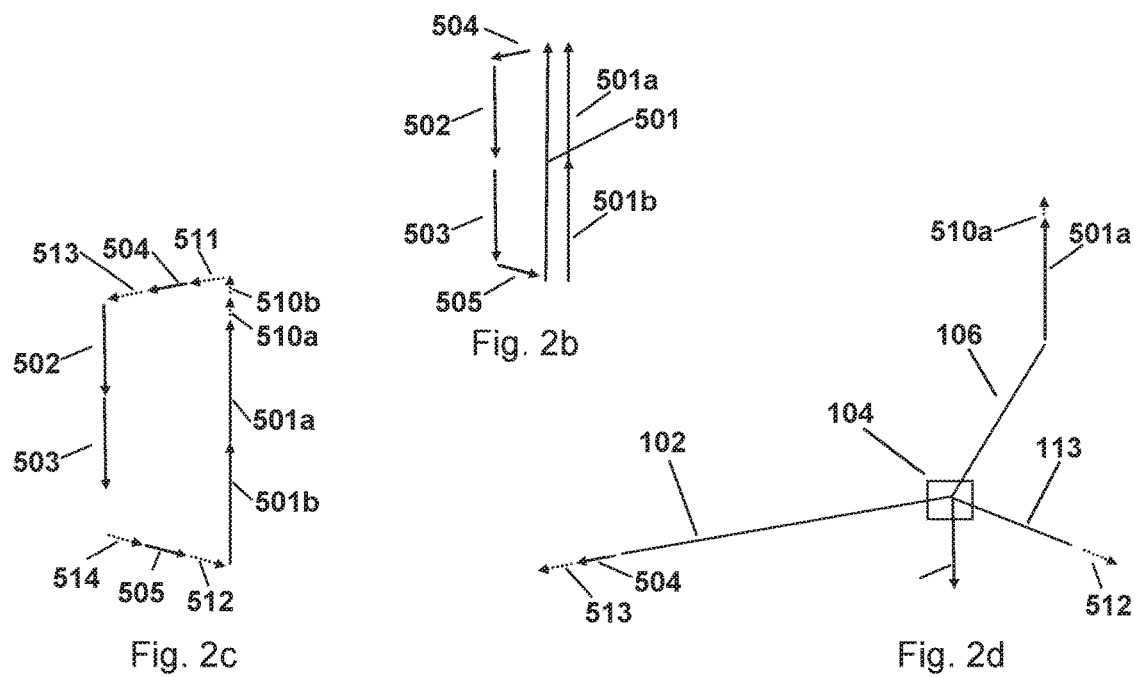
Fig. 2b
Fig. 2c
Fig. 2d

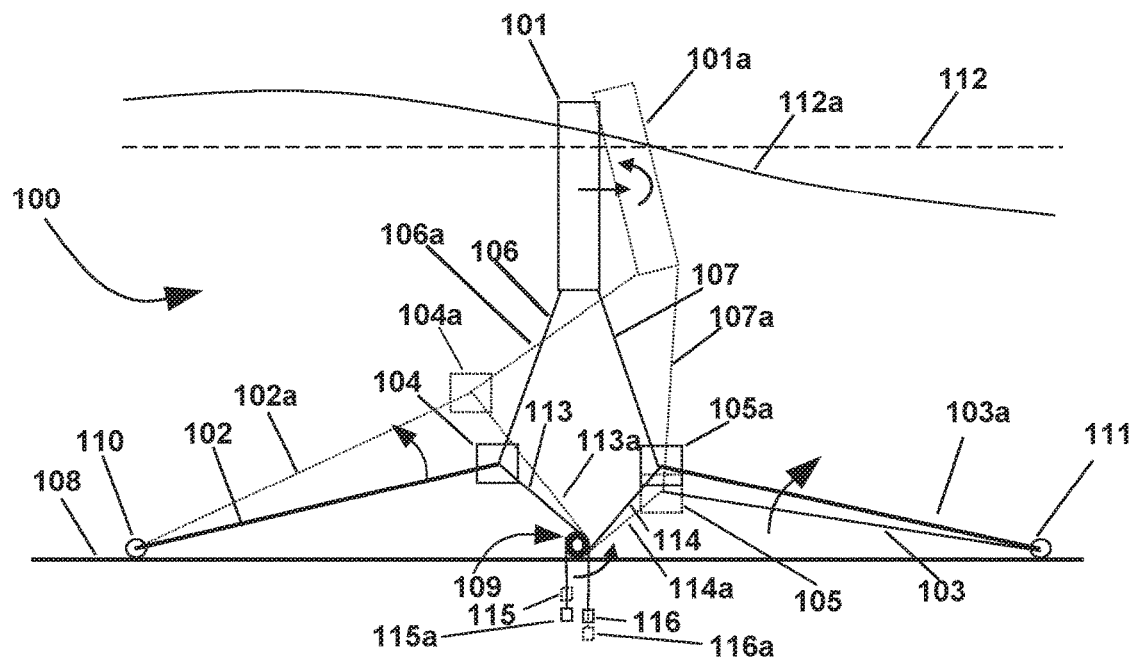
Fig. 4a
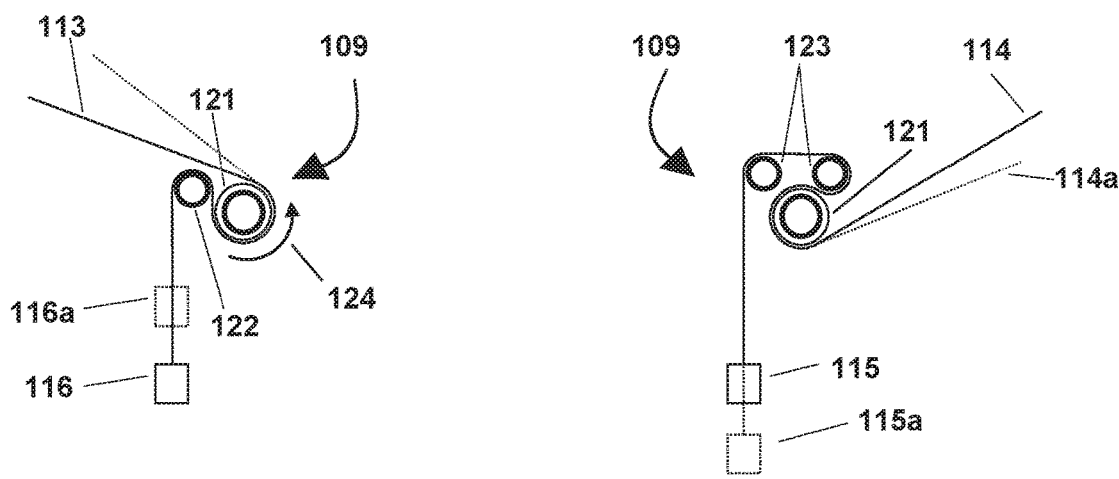
Fig. 4b                    Fig. 4c

DEVICE FOR CONVERSION OF MECHANICAL ENERGY FROM SEA WAVES TO ELECTRIC ENERGY

CROSS REFERENCE TO RELATED APPLICATIONS

This is a National Stage of International Application No. PCT/EP2016/068591, filed Aug. 3, 2016, the entire disclosure of which is hereby incorporated by reference in its entirety.

FIELD OF THE INVENTION

The present invention relates to an improved device for conversion of mechanical energy from sea waves to electric energy, that includes a float moved by sea waves, where the resulting displacement of the same float is given by the superposition of the horizontal (sway), vertical (heave) and rotational (roll) displacements, and that transmits some wave actions to some rigid rods, or to some cables, that are anchored through hinges to the sea bed. The rods are connected to respective ballasts and to a transmission shaft of an electric generator, by using cables or chains. The rotary oscillating motion of the rods is used to put the transmission shaft of the electric generator.

SUMMARY OF THE INVENTION

The main objective of the present invention is to propose an improvement in the device for conversion of mechanical energy from sea waves to electric energy disclosed in the Italian patent IT 1413116, by introducing an improvement in the connection structure of float cables, and in the position of generator transmission gears. The float connection structure and a different position of generator allow to increase the roll of the float (the rotary motion with reference to its center of mass), in respect to the heave (vertical) and to the sway (horizontal) oscillations, increasing the general efficiency of the total extracted energy in the device.

The position of the transmission shaft and the position of the generator is better, from an economical point of view, due to three reasons. The first is that the number of mechanical transmission gears and generators is decreased, and therefore a decrease of costs in construction and maintainance are achieved. The second is that the mechanical stress in the structure is decreased, and it is not of bending type but it is of axial type, more exactly of traction type, therefore cheaper rods can be used, or they can be changed with cables or ropes that are significantly cheaper than rods. The third is that it is possible to achieve a rotational speed in the generator transmission shaft that is higher in respect to that having a configuration where the generator is placed at the hinges; that achieves a simpler, cheaper and more efficient multiplier of revolutions per minute, that are necessary to make the electrical generator to work properly.

Another objective is that the same device has a stable equilibrium point, and that the horizontal or vertical or rotational oscillations in respect to the same point make it possible to activate an electrical generator.

Another further objective is that the same device should be installed off-shore in respect to deep water or to shallow water.

A further objective is that the same device should be part of a modular system that permits to produce a quantity of energy that is proportional to the amount of used sea surface, and proportional to the number of installed modules.

Another further objective is that, when the main direction of sea waves changes, the same device should adapt its orientation automatically without installing any additional add-ons.

Therefore, it is specific subject of the present invention an improved device for conversion of mechanical energy from sea waves to electric energy, comprising:

at least a float and two rigid rods, or flexible cables, preferably anchored at one end to the seabed, and at the other end to the float through flexible cables; two respective masses, called ballasts, as effect of their weight towards the sea bed keep the free ends of that rods constantly in traction and free to rotate around their hinges, and able to define a system of balanced forces where the float, even being subject to oscillations coming from the sea waves tends to move itself on the vertical line of system symmetry, characterized in that further comprising:

at least two cables, or two chains, that connect the free ends of the rods to a transmission shaft of a generator, or other device able to convert and/or transmit the energy, that is placed along the vertical line of system symmetry, so that the vertical, horizontal or rotary oscillatory motion of float, caused by the waves actions, generates an oscillatory motion of rods, which are pivoted on their respective hinges, and generates therefore the rotary motion of the transmission shaft of the generator of electric energy.

BRIEF DESCRIPTION OF THE DRAWINGS

The present invention is now being described according to non-limiting examples, with particular reference to the figures of the enclosed drawings, where:

FIG. 2a is a side schematic view of a device as that of FIG. 1a, where the external forces working on the device are represented;

FIG. 2b is a schematic view of the external forces working on the device in static conditions;

FIG. 2c is a schematic view related to an example of external forces working on the device in presence of incoming waves;

FIG. 2d is a side view of a detail of part of device as that of FIG. 1a, where the forces working on the left part of the same device are represented;

FIG. 4a is a side schematic view of a device as that of FIG. 1a, where the elements are moved according to a displacement of sway (horizontal) and roll (rotational) in the float;

FIG. 4b is a side view of a part of a device as that of FIG. 1a, where it is represented schematically and in detail the left part of the system of wrapping of cables, or chains, around the transmission shaft including a ring, or a pulley, and a so called freewheel, when the float has a sway (horizontal) and roll (rotational) displacement;

FIG. 4c is a side view of a part of a device as that of FIG. 1a, where it is represented schematically and in detail the right part of the system of wrapping of cables, or chains, around the transmission shaft including a ring, or a pulley, and a so called freewheel, when the float has a sway (horizontal) and roll (rotational) displacement;

DETAILED DESCRIPTION OF EMBODIMENTS OF THE INVENTION

It is underlined that only few of the many conceivable embodiments of the present invention are here described, which are just some specific non-limiting examples, having the possibility to describe many other embodiments based on the disclosed technical solutions of the present invention. In different figures, the same elements will be indicated with the same reference numbers.

Figure 1A:
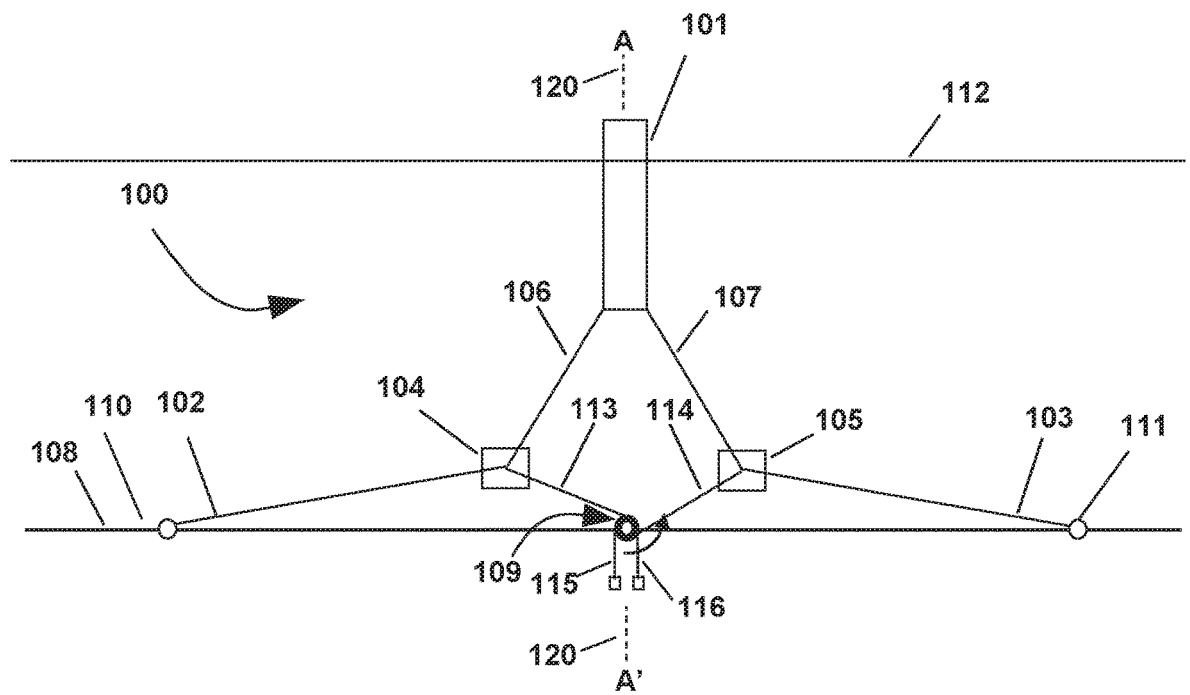
FIG. 1a shows a schematic side view of a device, according to the present invention, comprising a float and two rigid rods, or cables, anchored to the seabed by one of their ends.

With reference to FIG. 1a, the device 100 for conversion of mechanical energy from sea waves to electric energy, comprises: a float 101, placed on the sea surface 112; two rigid rods, or flexible cables, 102, 103, installed in a symmetrical position in respect to a vertical axis A-A' passing through the float 101, anchored to the seabed 108 in respective points 110, 111; two ballasts 104, 105, one for each of the rods 102, 103, placed at the opposite end of the hinge 110, 111, anchored to the seabed 108; two connecting cables 106, 107, between respective rods 102, 103, and the float 101, two cables, or chains, 113, 114, that connect the ends of the further rods from the hinges to a transmission shaft of a generator 109, to which two counterweights 115, 116 are connected; the connection of said chains 113, 114 to said shaft 109 is achieved by a mechanical gear containing a freewheel, that permits the transfer of motion along one rotary direction only, in the example in clockwise direction; therefore, according to a rotation up of the rods 102, 103, the elements between chains 113, 114, gear and shaft 109 are activated, and the shaft 109 rotates in example in a clockwise direction, and the counterweights 115, 116 are moved up; instead, when the rods 102, 103 rotate down, the freewheel does not permit the transmission of motion to the shaft 109 clockwise, and therefore no motion is transmitted to shaft 109 and generator, and the counterweights 115, 116 can move down with a distance equal to the decrease of length of cables, or chains 113, 114, keeping the same cables, or chains 113, 114 on traction, ready for the following transmission action when the rods return to rotate again upwards.

Figure 1B:
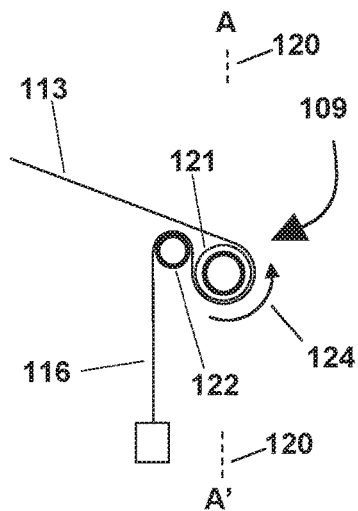
FIG. 1b shows a side view of a part of a device as that represented in FIG. 1a, where the left part of the system of wrapping of cables, or chains, around the transmission shaft includes a ring, or a pulley, and a so called freewheel.
Figure 1C:
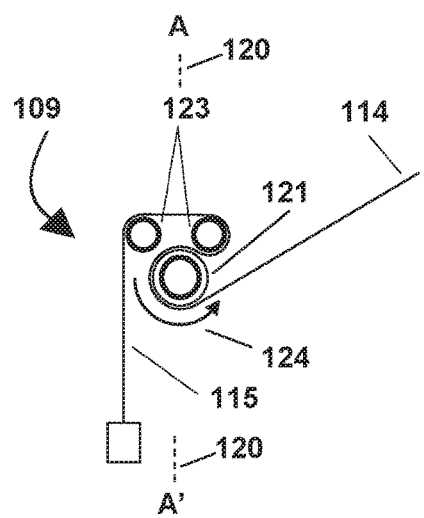
FIG. 1c shows a side view of a part of a device as that represented in FIG. 1a, where it is represented schematically the right part of the system of wrapping of cables, or chains, around the transmission shaft includes a ring, or a pulley, and a so called freewheel.

With reference to FIGS. 1b and 1c, the left and right part of the system connecting cables, or chains 113, 114, to the transmission shaft 109 of generator is represented more in detail. The system is composed by a system of gear/freewheel/transmission shaft 121, and by counterweights 115, 116: in FIG. 1b the cable, or chain 113, are coiled to element 121 on the upper side; when the device 100 is moved by waves, and chains, or cables, 113, 114, they tend to put element 121 on a counterclockwise rotary motion 124, the same chain is affected by the twisting moment of the generator to convert energy coming from the sea waves, the counterweight 116 is necessary just to keep the chain 113 constantly on traction. In FIG. 1c the cable, or chain 114, are coiled to element 121 on the lower side; when the device 100 is moved by waves, and chains, or cables, 113, 114, they tend to put element 121 on a clockwise rotary motion 124, the same chain is affected by the twisting moment of the generator to convert energy coming from the sea waves, the counterweight 115 is necessary just to keep the chain 114 constantly on traction.

Extraction of Energy

With reference to FIG. 2a, the system 100 is in a static condition, where the sea surface 112 does not have any motion, and there is a stable balance, with the float 101 that supports the weights of masses 104, 105, and rods 102, 103. The cables 106, 107, and the rods 102, 103, are always on traction. The cables, or chains 113, 114 are maintained on traction by counterweights 115, 116, and there is no production of energy, because the transmission shaft does not rotate and the generator does not express a resistant twisting moment.

The external forces of the system are the floating force in float 501, the weights of the ballasts 501, 502, and the reaction forces at the hinges 513, 514. The sea waves 112a along the direction 401 cause some actions on the float, in example 510, some additional actions at the hinges 513, 514, and the creation of actions 511, 512, on the transmission system of generator 109.

With reference to FIG. 2b the balance of external forces on device 100 in static conditions is represented more in detail, where the forces 501a, 501b represent a possible effect of the floating force 501 on the left and right side.

With reference to FIG. 2c a possible distribution of forces is represented, with additional actions due to the waves, where the forces are not balanced and therefore some parts of the device are affected by an upwards acceleration.

Figure 3A:
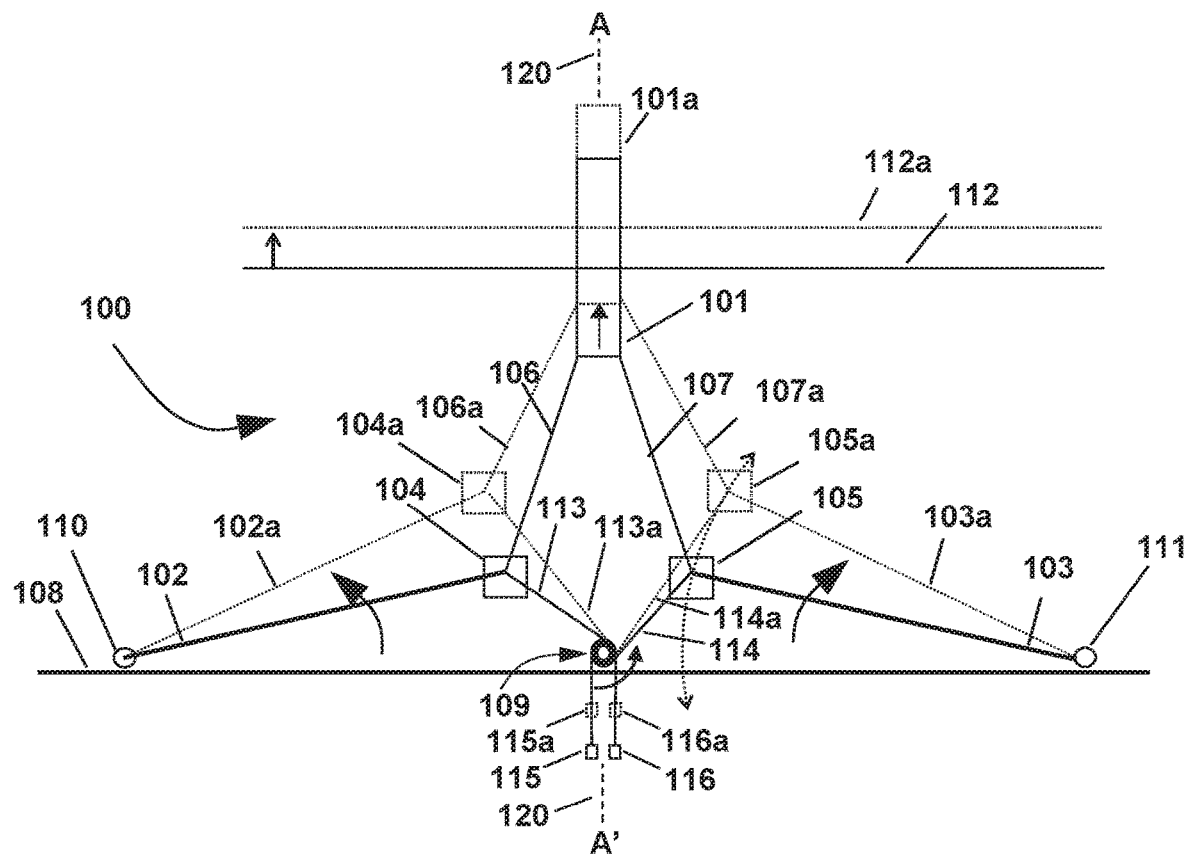
FIG. 3a is a side schematic view of a device as that of FIG. 1a, where the rods of the structure are subject to a rotation, in respect to their point of connection to the seabed, as an effect of a heave (vertical motion) of the float.

With reference to FIG. 2d the balance of forces at the left side, in static conditions and in presence of additional forces due to the waves, is represented more in detail. With reference to FIG. 3a, it is represented the extraction of energy according to a heave displacement, or vertical motion, of float 101 to position 101a.

The hinges 110, 111 are connected to the seabed 108, and the float 101, the cables 106, 107, the ballasts 104, 105, and the rods 102, 103, can move under the effect of a variation of sea level 112. The generator of energy, connected to the seabed 108, expresses some resistant actions in respect to the motion that the transmission system 109 tends to provide; the instantaneous power extracted by system 100 from the sea waves is given by the product of the rotational speed 124 with the resistant moment expressed by the generator.

The system 109 starts to transmit the forces for the production of energy when the surface 112 starts to move from the average level of the sea to the position 112a, moving the float 101 and the moving parts of system 100 together. However, the total displacement of the float 101 does not equal that of the sea surface, and it is shifted in time comparing them. In fact, this motion is opposed by the system for production of energy, either involving electric energy or hydraulic energy.

The above part of energy to be extracted by the system depends on the masses, on the size of the float and on the size of other elements that are comprised in the system 100; all the above data represent that parameters that define the system dynamics and the energy production. The optimization of the above elements leads to an optimization of the system of energy production in respect to the sea conditions and to the geographic location.

The transmission system 109 used to transmit forces to the energy generator is achieved with reference to the axis A-A' 120 of the same device. The cables, or the chains, 113, are connected to the upper part of the mechanical ring of the shaft 109, instead the cables, or chain, 114 to the lower part. When the rods 102, 103 move up to positions 102a, 103a, the cables, or chains, 113, 114, pull to a larger distance 113a, 114a, and therefore the shaft rotates as an effect of this action; the counterweights 115, 116 are in turn pushed to positions 115a, 116a.

Figure 3B:
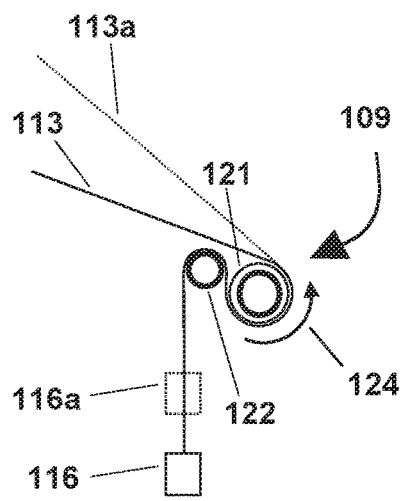
FIG. 3b is a side view of a device as that of FIG. 1a, where it is represented schematically and in detail the left part of the system of wrapping of cables, or chains, around the transmission shaft including a ring, or a pulley, and a so called freewheel, when the float has a heave (vertical) displacement.
Figure 3C:
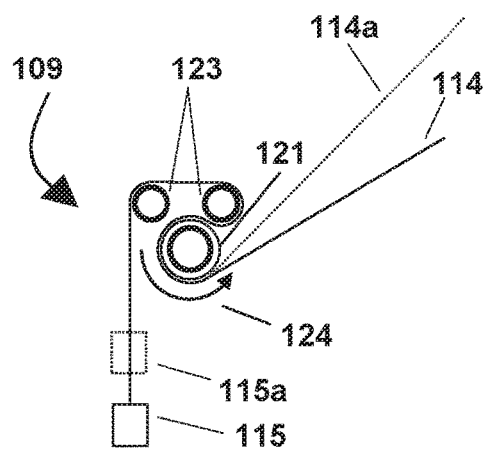
FIG. 3c is a side view of a device as that of FIG. 1a, where it is represented schematically and in detail the right part of the system of wrapping of cables, or chains, around the transmission shaft including a ring, or a pulley, and a so called freewheel, when the float has a heave (vertical) displacement.

With reference to FIGS. 3b and 3c it is here described more in detail the left side and the right side of the connection structure with cables, or chains, 113, 114, to the system of transmission of generator 109, and the effects on the rotation of shaft 121 and on production of energy. Both in the left side and in the right side the rotation of rods upwards causes a variation of distance in the point of connection of cables, or chains, 113, 114, that becomes 113a, 114a. This variation of distance causes the rotation 124 of the shaft 121, because the freewheel permits the transfer of force according to counterclockwise rotations and, definitely the transmission of force to the generator for production of energy.

On the contrary, when the rods 102a, 103a rotate downwards in positions 102, 103, the distances 113a, 114a are decreased to distances 113, 114. However, as an effect of this decreased distance, the freewheel does not allow the connection of the ring with the shaft, because the ring rotation is provided in clockwise direction; furthermore there are no transmitted forces to the transmission shaft, no energy would be produced, and the counterweights 115a, 116a move to positions 115, 116 maintaining always the cables, or the chains, 113, 114, on traction.

With reference to FIGS. 4a, 4b, 4c, the production of energy is described with reference to a simultaneous sway (horizontal) and roll (rotational) displacement of float 101 in position 101a, caused by passage of the sea wave 112a that introduces a variation in the balance conditions 112. The float causes a displacement of cables 106, 107 of ballasts 104, 105, and of rods, or cables, 102, 103, that move in a new configuration 106a, 107a, 104a, 105a, 102a, 103a. The rod 102 moves to position 102a, rotating upwards, and rod 103 to position 103a, rotating downwards. The cable, or the chain, 113 moves to a higher distance between rod and shaft, equal to 113a; the transmission shaft is connected by the freewheel that permits the rotation, counterclockwise in the example, with production of energy from the generator that it is connected to it; the counterweight 116 is moved upwards. The rod 103, moving to position 103a, rotates downward; in this case the freewheel does not permit the transfer of force and the motion in a clockwise direction of the transmission shaft, there would be no production of energy and there would be no forces in the cable, or chain, 114, due to the production of energy; the counterweight moves from position 115 to position 115a, maintaining the chain 114 on traction.

Embodiment of the Invention in Shallow Water

Figure 5:
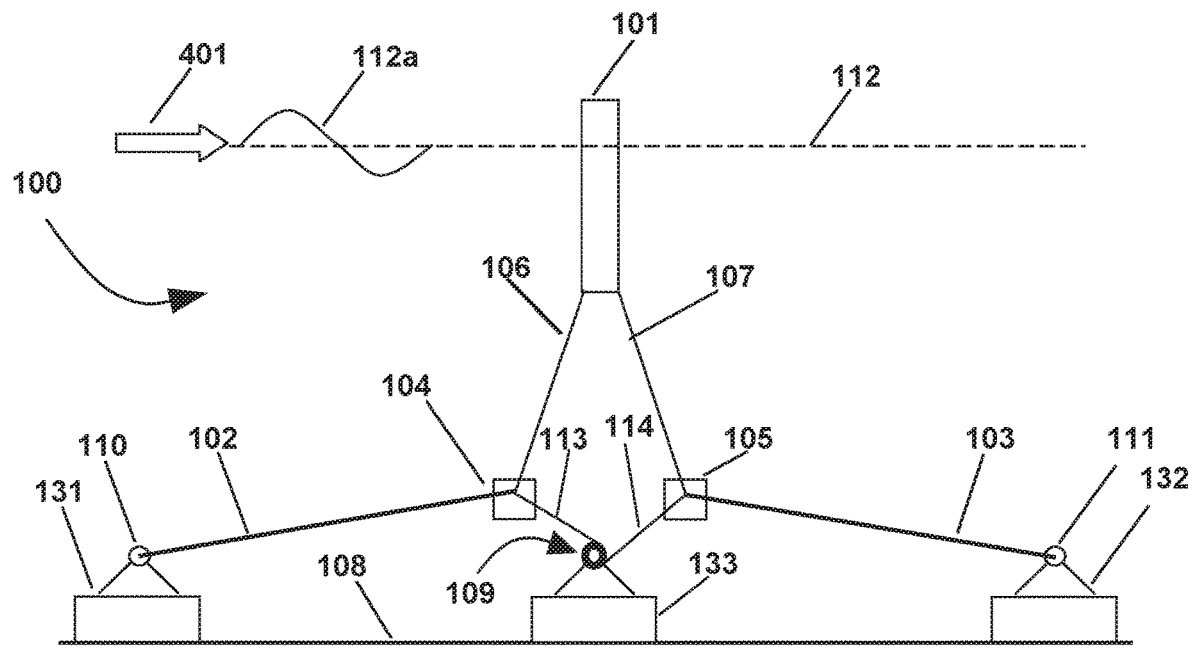
FIG. 5 is a side schematic view of a device, according to the present invention, with reference to an embodiment able to be installed in shallow water.
Figure 6:
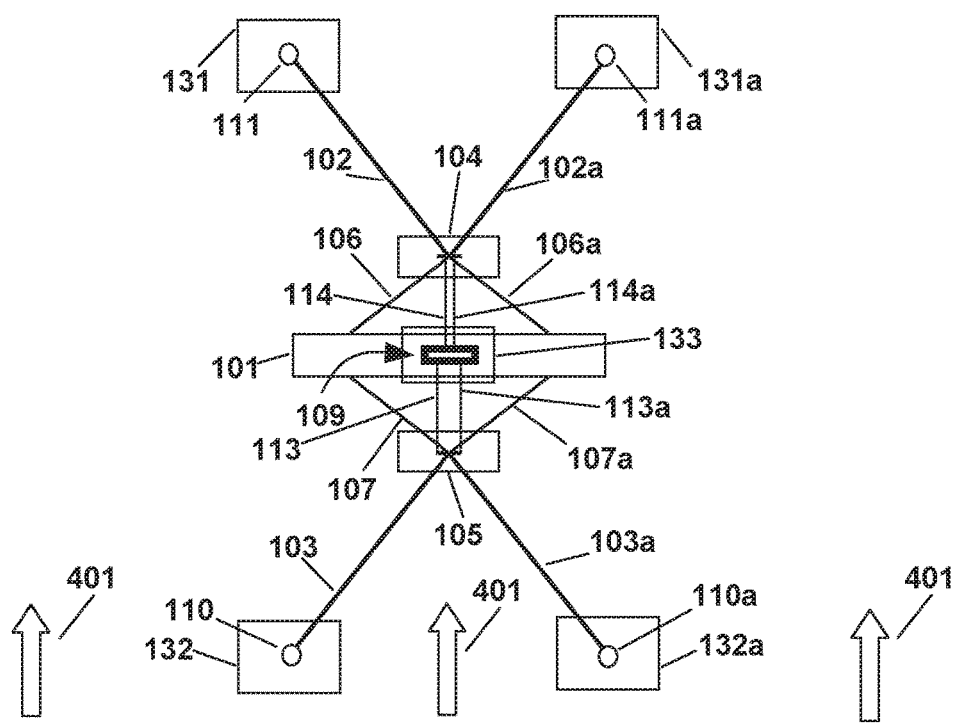
FIG. 6 is a top schematic view of a device, according to the present invention, according to an embodiment able to be installed in shallow water.

FIGS. 5-6 show respectively, as a side view and a top view, an example of installation in shallow water, of 10-20 m depth. The position of hinges 110, 111, and of transmission 109 to generator, must be blocked on the seabed 108, and the fixing elements should be able to give resistance to forces that tend to decrease the distance of hinges 110 and 111, to move them upwards, or to move the transmission 109.

In shallow water, the device composed of generator 109 and hinges 110, 111 can be placed directly on the seabed 108, in example by using adaptable trestles 131, 132, 133, but the position must be in any case fixed on the seabed, through a system of anchors and ballasts, with a possible addition of cables and anchors, in order to resist to actions that would tend to move the device upwards and/or sidely.

In FIG. 6, the system described from a top view presents, on a side, the cables 106, 106a, the rods or cables 102, 102a, rotating in respect to 131, 131a, a ballast 104 and some cables, or chains, 114, 114a, connected to the transmission system 109, connected to point 133.

On the opposite side the system presents some cables 107, 107a, some rods, or cables, 103, 103a, rotating in respect to 132, 132a, a ballast 105 and some cables or chains 113, 113a, connected to the transmission system 109.

The system described in FIGS. 5-6 does not change its orientation automatically, rotating itself along a direction that is perpendicular to the direction of waves source, because the direction of waves source in shallow water is approximately perpendicular to the coast line. Therefore, with reference to the installation site, by placing properly the device 100, so that the most frequent waves having the highest power 112a are in a direction 401 that is perpendicular to the float, it is possible to maximize the available energy. However, all the components in the structure should be designed in order to take in due account the other waves and forces coming from a different direction in respect to that perpendicular to the float.

Embodiment of the Invention in Deep Water

FIGS. 7, 8, 9a and 9b show respectively, as a side view and a top view, an example of installation in deep water, more than 30 m depth.

Figure 7:
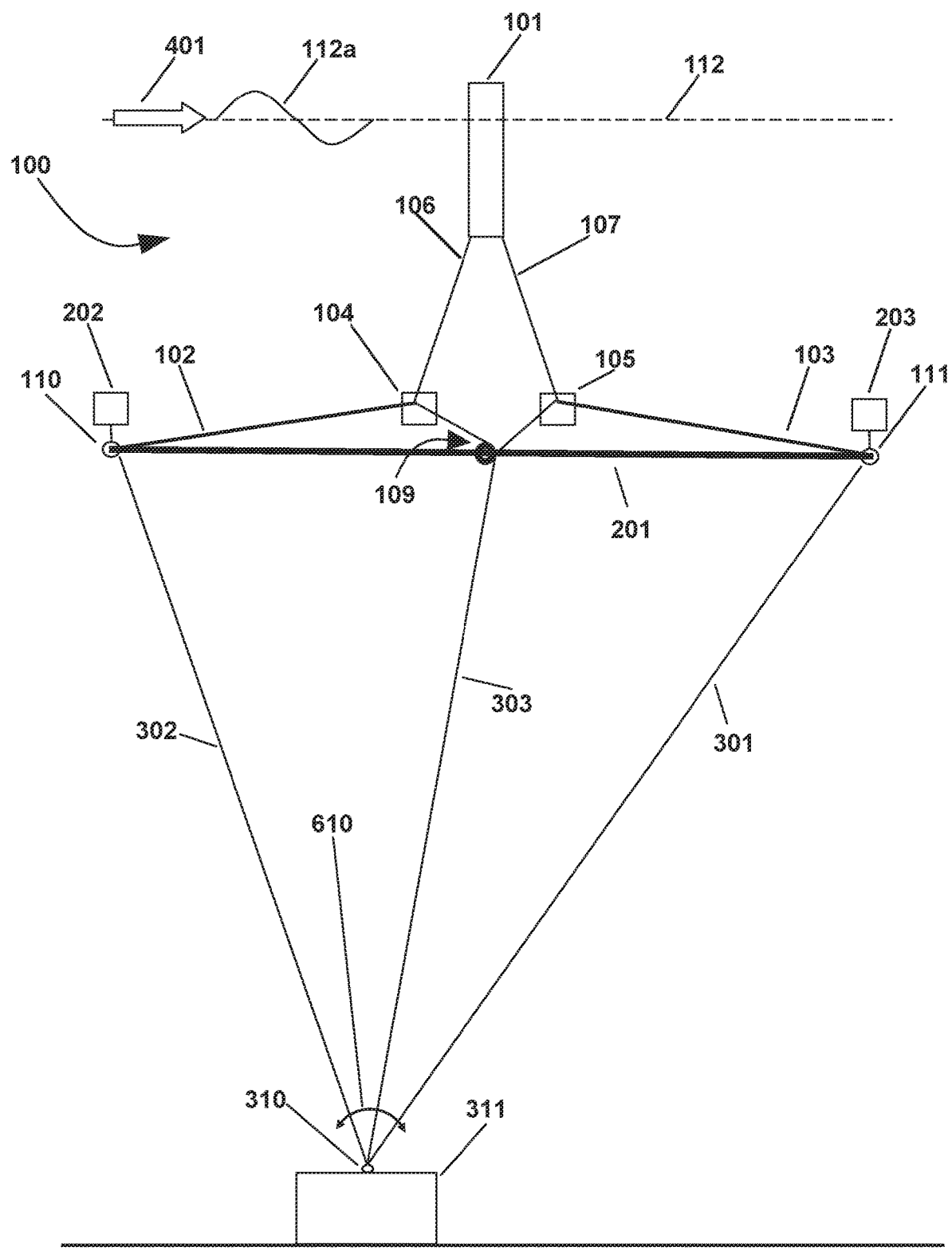
FIG. 7 is a side schematic view of a device, as that of FIG. 1a, according to an embodiment able to be installed in deep water.
Figure 8:
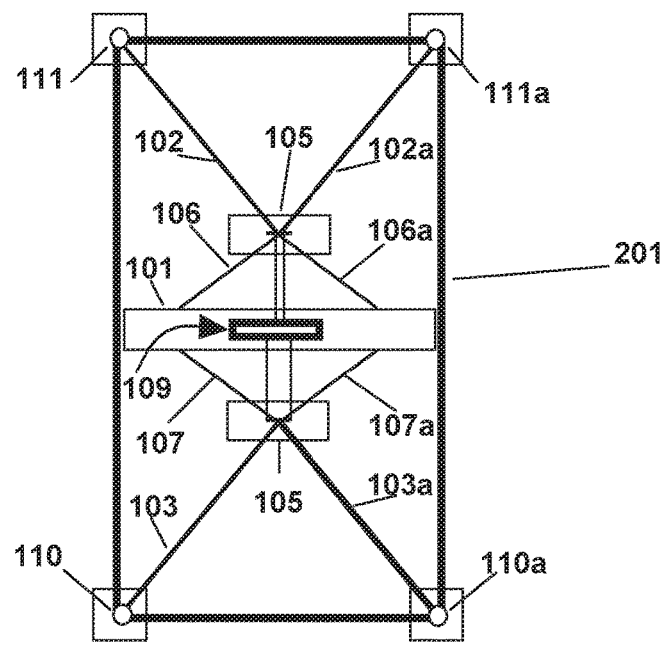
FIG. 8 is a top schematic view of a device, according to the present invention, with reference to an embodiment able to be installed in deep water.
Figure 9A:
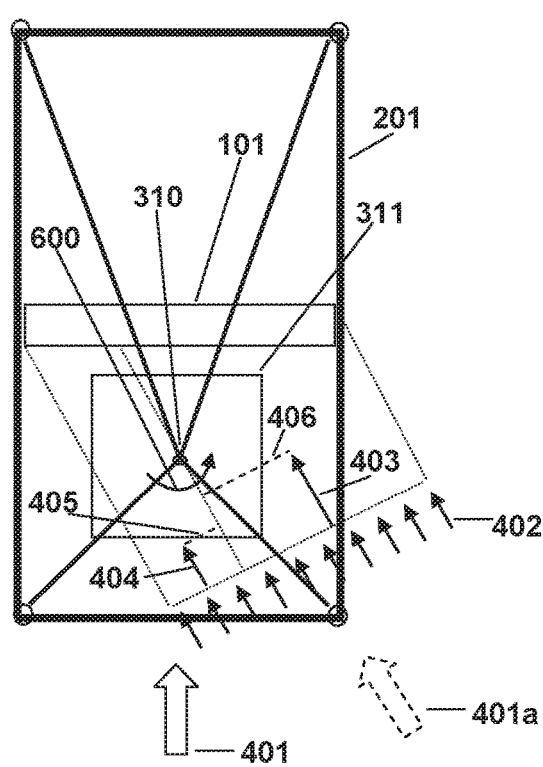
FIG. 9a is a top schematic view of a device, according to the present invention, with reference to an embodiment able to be installed in deep water.
Figure 9B:
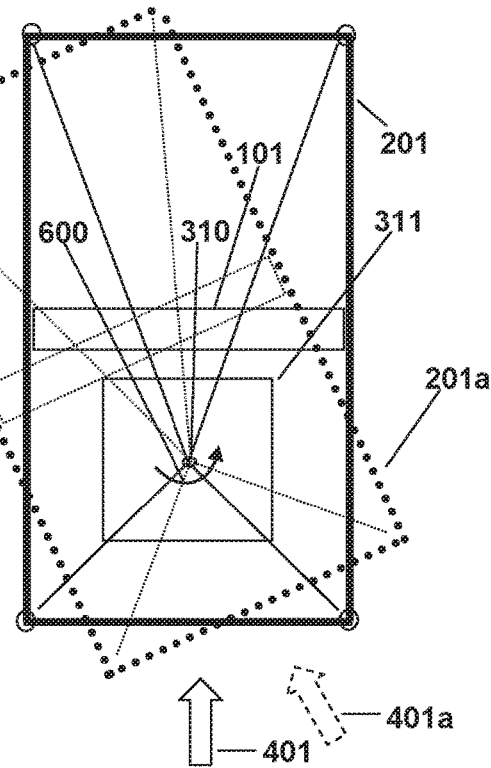
FIG. 9b is a top schematic view of a device, according to the present invention, with reference to an embodiment able to be installed in deep water.

In the example, the system 100 comprises:
a structure 201 able to avoid that the two hinges can be moved closer each other;
the structure 201 is self-floating and can be equipped with auxiliary floats 202, 203, able to keep the system at a specific level of depth;
a system of mooring cables 301, 302, 303 is connected to an anchor, or ballast 311, placed in the seabed and that should avoid the system to lift up, permitting at the same time the rotary motion in respect to a hinge 310, either in the plane shown in FIG. 7 and in the top view shown in FIGS. 8, 9a and 9b; the system of cables 301, 302, 303 is properly designed according to different lengths, so that the balanced system does not have the hinge 310 aligned to the float 101. As shown in FIGS. 9a and 9b, the objective is to achieve some forces that make the system to orientate itself along a direction that is perpendicular to the direction of waves 112a arriving from the direction 401. With reference to FIG. 9a, in case that the waves change direction from which they arrive, in example from 401 to 414a, on the float some forces 402 push so that the resulting 403 for the arm 406 defines a moment in respect to hinge 310 that is greater in respect to the resulting 404 for the arm 405. Therefore, this moment defines a rotation 600 and the system moves, as indicated in FIG. 9b, from position indicated in 201 to position 201a.

In the represented example, given the same number of waves, the device for deep water is characterized by a different energy production in respect to that for shallow water, because the hinges 110, 111, tend to move together with the floating structure 201 in respect to the hinges that are anchored to the seabed. In fact, the structure 201 can have rotations 610 around the hinge 310 and this aspect does not represent a necessarily positive or negative fact, because the amount of these displacements, that can increase or decrease the extracted energy, depends on the inertia of structure 201 and on the system of forces working on the device 100.

Improvements of the Solution In Respect to Device Disclosed in Italian Patent it 1413116

Figure 10:
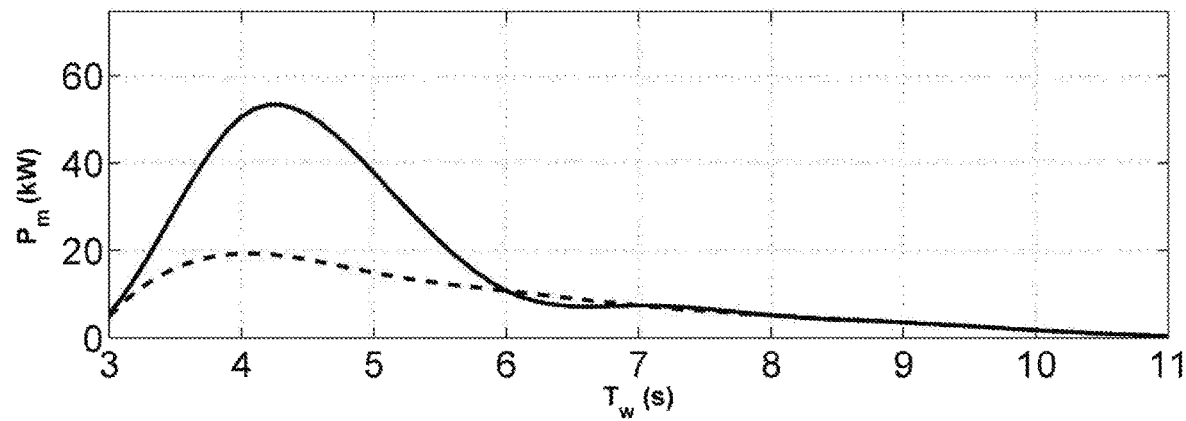
FIG. 10 is a view of graphics where it is represented the extracted power of two generators installed at the hinges, according to device of the Italian patent IT 1413116, and the extracted power of one generators installed at a central position, according to the present invention.
Figure 11:
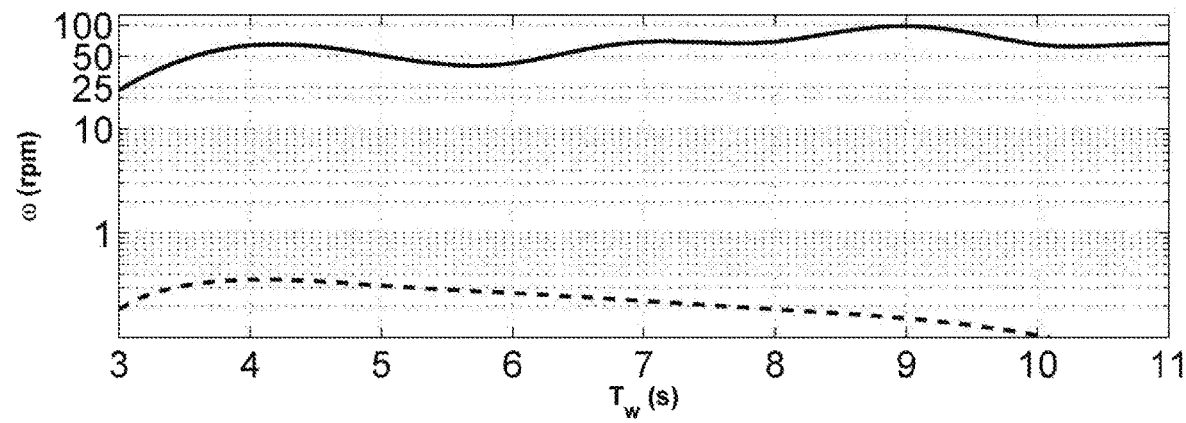
FIG. 11 is a view of graphics where it is represented the revolutions per minute and angular distance at the hinges, according to device of the Italian patent IT 1413116, and that achieved by a transmission shaft installed at a central position, according to the present invention.

With reference to all the enclosed figures, the position of the generator aligned to the floating device introduces the following improvements:
in the present invention, it is possible to achieve a single transmission shaft 109 aligned to the device, and consequently a single generator instead of the two systems in the hinges and two generators of device disclosed in IT 1413116; and that introduces an economical advantage because, given the same power, the cost of a single device is cheaper than that of two devices;
in the present invention the resistant action expressed by the transmission system 109 and by the generator to produce energy, causes an action of traction of rods 102, 103, instead of action of traction and bending moments expressed by system 109 in case of installation on hinges in the device disclosed in IT 1413116; this gives an economical advantage because the actions of bending type lead to a design of rods that are more expensive in respect to cables, usable only in case of actions of traction;
the use of chains 113, 114, and of system 109 with freewheel of the present invention makes it possible to convert the energy extracted from waves to a rotary motion along one direction, where the rotational speed of shaft 121 is greater than that achievable with a transmission shaft on hinges as that of the device disclosed in IT 1413116; the rotational speed of the transmission shaft depends on the diameter that is possible to use, and it is at least 10-20 times that achievable with transmission at the hinges; that leads to a cheaper cost of production and less waste of mechanical energy because, for use of electrical generators could be not necessary a multiplier of revolutions or could be a relatively simpler component in respect to that of device described in IT 1413116; with reference to FIG. 11 it is possible to observe that the number of revolutions per minute of the shaft in the present invention, indicated by the upper continuous curve, is greater than that achievable in respect of device of IT 1413116, indicated by the lower dotted curve;
the position of generator aligned to device A-A' together with that of connection to the float, in the form indicated by the present invention, allows an increase of the extracted energy, because the roll motion can be increased in respect to that of heave and sway; in fact the roll allows an higher efficiency in the extraction of energy in respect to the other two motions; with reference to FIG. 10 the average power generated by the system of the present invention, indicated by the upper continuous curve, is greater than that achievable with the device of IT 1413116, indicated by the lower dotted curve.

Description of Graphics and Model

The graphics of FIGS. 10 and 11 show the results obtained numerically for the solution of patent IT 1413116 (dotted lines) and for the improved solution of the present invention (continuous lines). In particular, the results are related to a configuration in deep water (50 m depth), with a width at the basis of 30 m, a float 101 having length of 12 m, a height of 8.5 m and a width of 2.0 m. The length of the rods at the basis 102, 103 is 10.5 m, the length of cables 106, 107 is 7.0 m.

The numerical model includes a first module (finite elements model) that estimates the hydrodynamic parameters (added mass, damping coefficients, excitation forces) and a second module (finite differences) that solves the motion equation of the complete system composed by a float 101, the mooring 102, 106, 107, 103, and by masses 104, 105. The results in FIGS. 10 and 11 are related to monochromatic waves having wave heigth of 1 m and a variable period T.

From FIG. 10 it is possible to observe that the extracted power $P_m$, related to the improved solution of the present invention (continuous line) is significantly higher in respect to the device of patent IT 1413116 (dotted line).

From FIG. 11 it is seen that the angular speed (w) is significantly increased from values lower than 1 rpm (dotted line) up to values that go beyond 25 rpm (continuous line) and reach, in some periods of the incoming wave, the value of 100 rpm.

As observed already, the angular speed reached with the improved solution of the present invention permit to use simpler multipliers of revolutions, cheaper, feasible and efficient, because the loss of mechanical energy in gears are decreased.

Said graphics represented in figure, although they do not represent a complete analysis of the results in respect to a variation of all the design parameters in device, and although being referred to a monochromatic wave having height equal to 1 m, show exactly the improvements introduced by the present invention.

Modular Embodiment of the Invention

Figure 12:
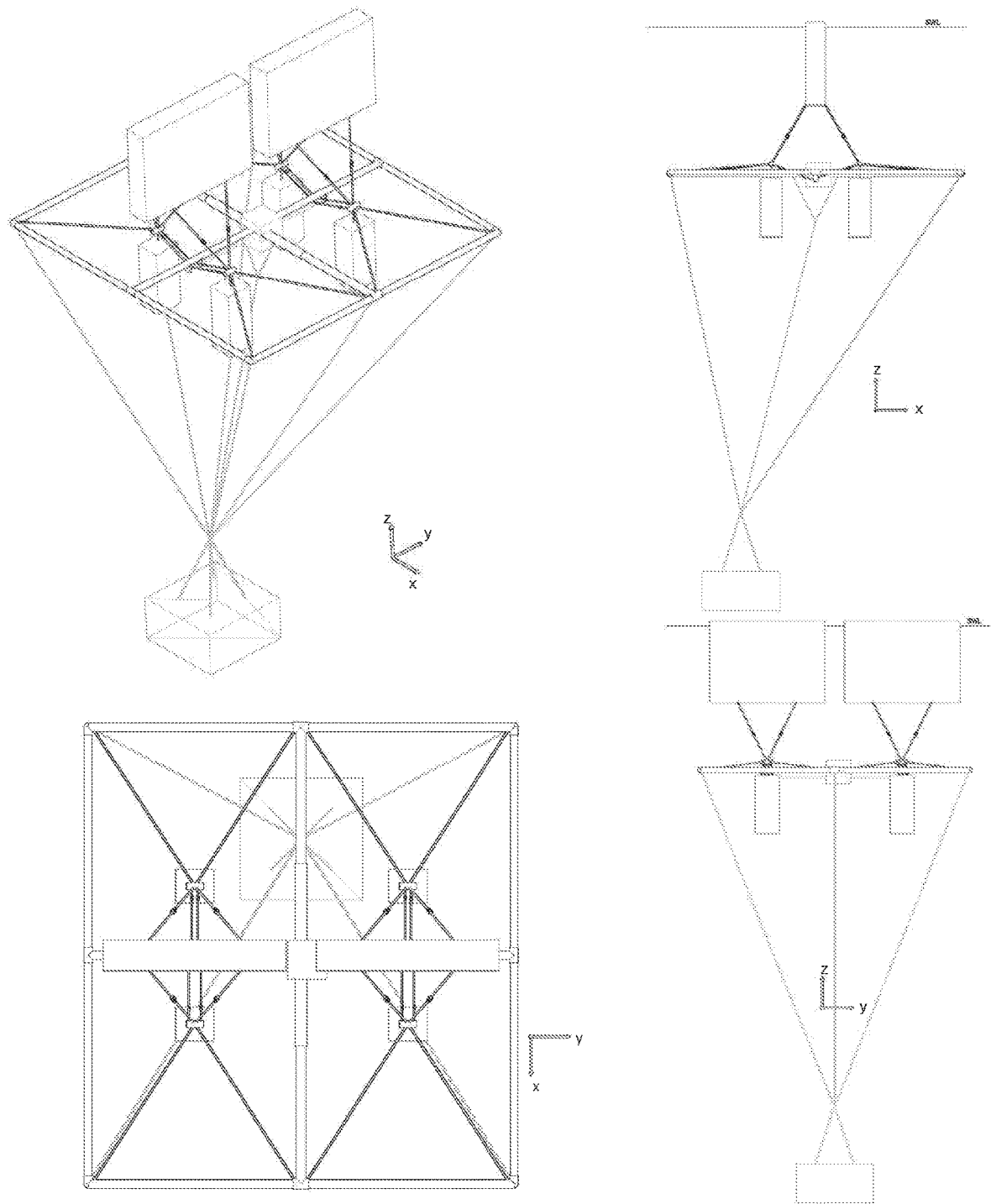
FIG. 12 represents a three-dimensional perspective view and three orthogonal views of a device like that of FIG. 1, in the form of FIGS. 7-8, that can be installed in respect to deep water, in a modular configuration that includes two structures connected as a sequence each other.

FIG. 12 represents a three-dimensional perspective view and three orthogonal views of a device like that of FIG. 1, in the form of FIGS. 7-8, that can be installed in respect to deep water, in a modular configuration that includes two structures connected as a sequence each other. In this case, the devices are installed in deep water and the energy production increases in proportion to the size of sea surface that is used.

Figure 13:
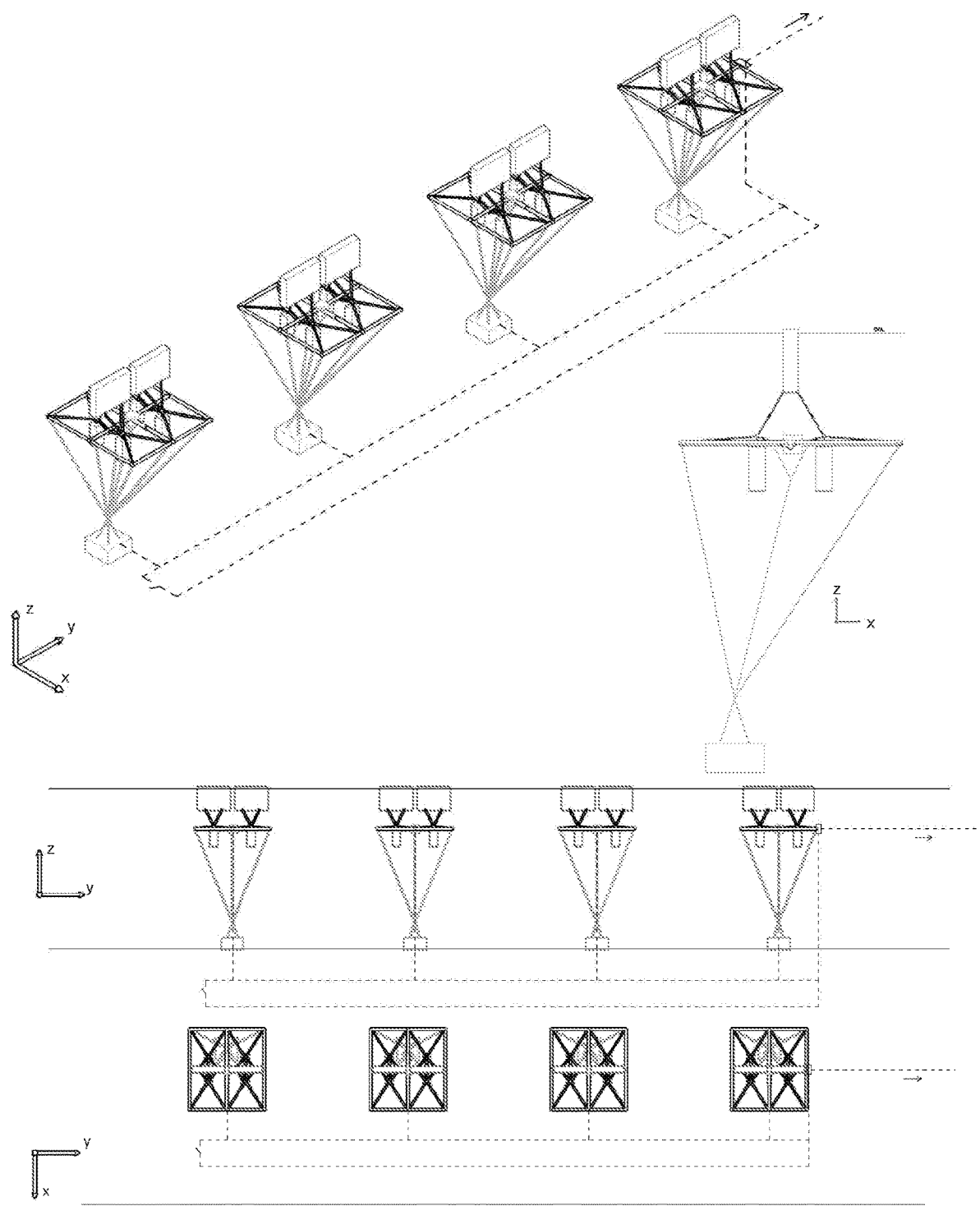
FIG. 13 represents a three-dimensional perspective view and three orthogonal views of a device like that of FIG. 1, in the form of FIGS. 6-7, that can be installed in respect to deep water, in a modular configuration that includes two structures connected as a sequence each other.

Instead, FIG. 13 represents an example of a series of devices like that of FIG. 1, in the form of FIGS. 6-7, that can be installed in respect to deep water. In a modular configuration that includes two structures connected as a sequence each other. In this case, the devices are installed in deep water and the energy production increases in proportion to the size of sea surface that is used. A three-dimensional perspective view and three orthogonal views are represented of a device in a configuration having more modules, where each single module includes two structures like that of FIG. 12 connected as a sequence each other.

Therefore, the above examples show that the present invention reaches all the expected objectives. In particular, it permits to achieve an improvement in the device for conversion of mechanical energy from sea waves to electric energy disclosed in the Italian patent IT 1413116, by introducing an improvement in the connection structure of float cables, and in the position of generator transmission gears. The connection structure of float and a different position of generator makes it possible to increase the roll of the float (the rotary motion with reference to its center of mass), in respect to the heave (vertical) and to the sway (horizontal) oscillations, increasing the general efficiency of the total extracted energy in the device.

The position of the transmission shaft and the position of the generator is better, from an economical point of view, due to three reasons. The first is that the number of mechanical transmission gears and generators is decreased, and therefore a decrease of costs in construction and maintainance are achieved. The second is that the mechanical stress in the structure is decreased, and they are not of bending type but they are of axial type, more exactly of traction type, therefore cheaper rods can be used, or they can be changed with cables or ropes that are significantly cheaper than rods. The third is that it is possible to achieve a rotational speed in the generator transmission shaft that is higher in respect to that with a configuration where the generator is placed at the hinges; that achieves a simpler, cheaper and more efficient multiplier of revolutions per minute, that are necessary to make the electrical generator to work properly.

Then, according to the invention, the same device has a stable equilibrium point, and that the horizontal or vertical or rotational oscillations in respect to the same point make it possible to activate an electrical generator.

The same device can be installed off-shore in respect to deep water or to shallow water.

Further according to the invention, the same device can be part of a modular system that permits to produce a quantity of energy that is proportional to the amount of used sea surface, and proportional to the number of installed modules.

Furthermore, when the main direction of sea waves changes, the same device can adapt its orientation automatically without installing any additional add-ons.

The present invention has been described by making reference to some non-limiting examples and following some preferred embodiments; however it goes without saying that modifications and/or changes could be introduced by those skilled in the art without departing from the relevant scope, as defined in the enclosed claims.

We claim:

1. A device for converting mechanical energy from sea waves to electric energy, comprising:
   at least a float and two rigid rods, or flexible cables, preferably anchored at one end to the seabed, and at the other end to the float through flexible cables;
   two respective masses, called ballasts, as effect of their weight towards the sea bed keep the free ends of that rods, constantly in traction and free to rotate around their hinges, and able to define a system of balanced forces where the float, even being subject to oscillations, coming from the sea waves, tends to move itself on the vertical line of system symmetry, the vertical line of system symmetry including at least two cables, or two chains that connect the free ends of the rods to a transmission shaft of a generator, or other device able to convert the energy that is placed along the vertical line of system symmetry, so that the vertical, horizontal, or rotary oscillatory motion of the float, caused by the wave's actions, generates an oscillatory motion of the rods, which are pivoted on their respective hinges, and generates therefore the rotary motion of the transmission shaft of the generator of electric energy.

2. The device of claim 1 wherein the connection of said chains to said shaft is achieved by a mechanical gear containing a freewheel, that permits the transfer of motion along one rotary direction only; two counterweights are connected to the chains so that according to a rotation up of the rods, the elements between chains, gear and shaft are activated, and the shaft rotates in example in a clockwise direction, and the counterweights are moved up; instead, when the rods rotate down, the freewheel does not permit the transmission of motion to the shaft clockwise, and therefore no motion is transmitted to shaft and generator, and the counterweights can move down.

3. The device of claim 1 wherein the system connecting cables, or chains, to the transmission shaft of generator, is composed by a system of gear/freewheel/transmission shaft, and by counterweights: the cable, or chain, are coiled to element on the upper side; when the device is moved by waves, and chains, or cables, they tend to put element on a counterclockwise rotary motion, the same chain is affected by the twisting moment of the generator to convert energy coming from the sea waves, the counterweight is necessary just to keep the chain constantly on traction; the cable, or chain, are coiled to element on the lower side; when the device is moved by waves, and chains, or cables, they tend to put element on a clockwise rotary motion, the same chain is affected by the twisting moment of the generator to convert energy coming from the sea waves, the counterweight is necessary just to keep the chain constantly on traction.

4. The device of claim 1 wherein the transmission of energy is achieved according to a heave displacement, or vertical motion, of float to position 101*a*, when the rods move up to positions 102*a*, 103*a*, the cables, or chains, pull to a larger distance 113*a*, 114*a*, and therefore the shaft rotates as an effect of this action; the counterweights are in turn pushed to positions 115*a*, 116*a*.

5. The device of claim 1 wherein the transmission of energy is achieved according to a horizontal displacement and rotary displacement of float to position (101*a*), caused by passage of a sea wave; cables shallow waters ballasts and of rods move to a different configuration; rod moves to position 102*a*, rotating up, and rod moves to position 103*a*, rotating down; the cable, or chain, pulls to a larger distance between rod and shaft, equal to 113*a*; the transmission shaft is activated from the freewheel that permits the rotation; the counterweight is pushed up; rod moves to position 103*a*, rotating down; in this case the freewheel does not permit the rotation; the counterweight moves to position 116*a* and keeps the chain on traction.

6. The device of claim 1 wherein, for installations in shallow water of 10-20 m in depth, the position of hinges and of transmission to generator, must be blocked on the seabed, in example by using adaptable trestles.

7. The device of claim 1 wherein, for installations in deep water of more than 30 m of depth, the device further comprises: a structure able to avoid that the two hinges can be moved closer each other; the structure is self-floating and can be equipped with auxiliary floats, able to keep the system at a specific level of depth; a system of mooring cables is connected to an anchor, or ballast, placed in the seabed and that should avoid the system to lift up, permitting at the same time the rotary motion in respect to a hinge.

8. The device of claim 7 wherein the device is placed along a direction that is perpendicular to direction of sea waves; in case that sea waves change the direction they come from, in example from 401 to 414*a*, some pressure 402 has effect on float with a component on arm causing a moment in respect to hinge having higher intensity in respect to that caused by the component of arm; said moment causes therefore a rotation and the device moves from a position 201 to a position 201*a*.

9. The device of claim 7 wherein, for installations in deep water, it is possible a modular configuration, that includes at least two structures, each of them being represented by an improved device, connected in sequence each other, so that the production of energy increases proportionally to the sea surface involved by the above said devices.

\* \* \* \* \*